Patented Nov. 21, 1944

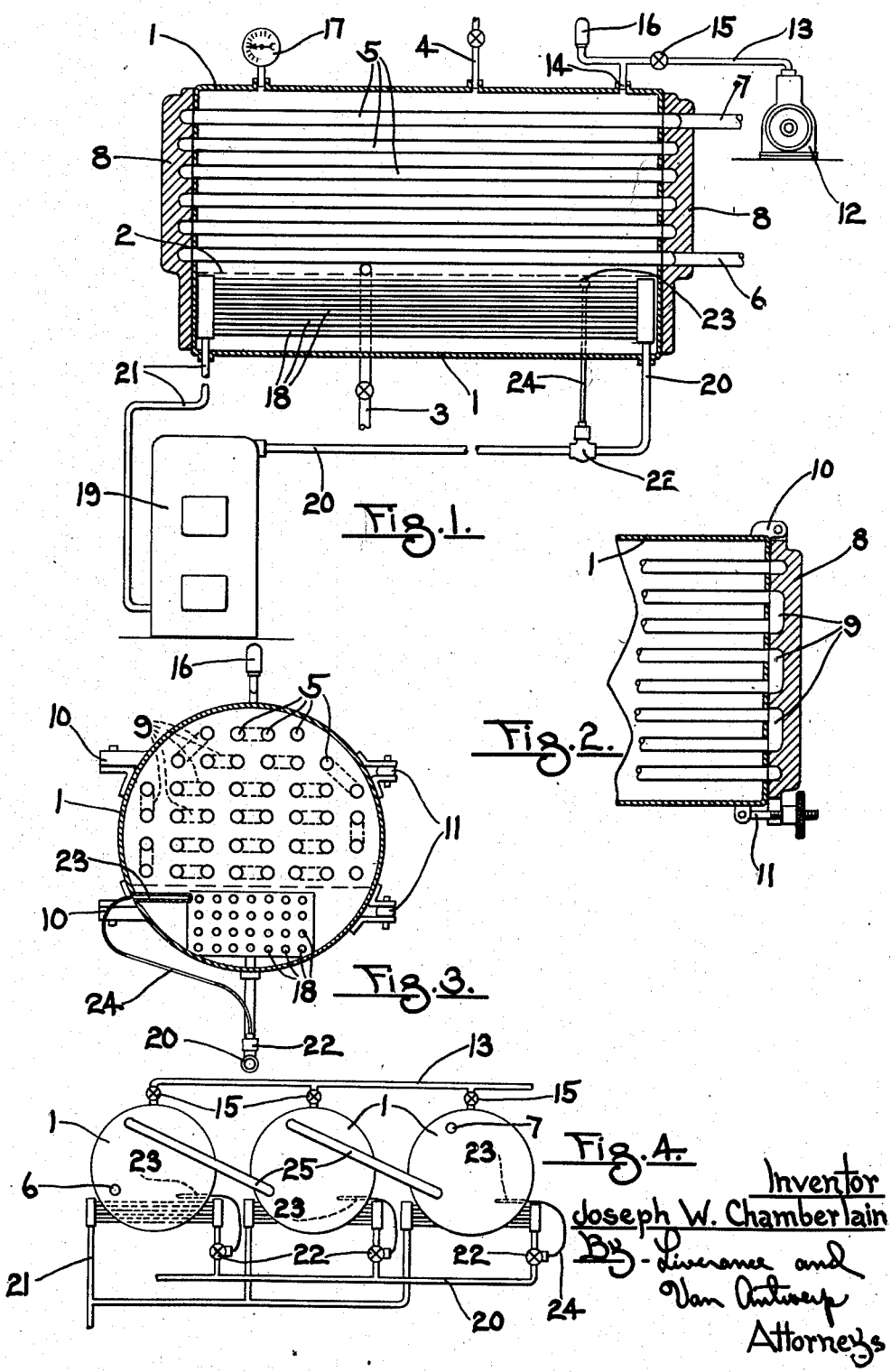

2,363,118

UNITED STATES PATENT OFFICE 2,363,118

APPARATUS FOR HEATING FLUIDS

Joseph W. Chamberlain, Zeeland, Mich.

Application March 11, 1942, Serial No. 434,184

5 Claims. (Cl. 257—2)

This invention relates in general to an apparatus for heating fluids either in the liquid or gaseous state. While the device is designed so as to heat practically any fluid, it has been shown to operate satisfactorily in the milk industry and therefore, for purposes of illustration I have shown and described the apparatus as it relates particularly to the heating of milk which may or may not subsequently have a further operation performed thereon.

At the present time in such equipment as preheaters, pasteurizers, evaporators and roller driers, commonly used in milk plants, the milk is heated either by means of steam at temperatures of 212° F. or more, or by means of circulating or spraying hot water. There are particular disadvantages arising out of the use of such heating means as far as milk is concerned and it is presumed that similar disadvantages are also present in heating other fluids. Generally if there is a 10° or more difference between the milk being heated and the heat applied to it the milk will "burn on" the equipment thereby not only affecting the efficiency thereof but also affecting the taste of the milk itself. In the case of heating the milk by hot water it is necessary to flow the water around the surface to be heated within which the milk is confined by means of baffles or confined pipes and in such case there will be a coating deposited on the tubes or heating surfaces which not only acts as a layer of insulation to thereby reduce the efficiency of the equipment, but also necessitates a periodic tearing down and cleaning of the equipment itself.

Another disadvantage arising from the use of hot water is that it is quite hot at the time it enters the equipment and immediately starts to cool down as the heat is transferred to the milk so that it is quite cool before it leaves the equipment to be reheated and recirculated. This can be overcome to a certain extent if the capacity of the equipment is quite large, and a great amount of water can be circulated, but this has disadvantages from a practical standpoint. Ordinarily when hot water is used high pressure steam is used to heat and circulate the water and if a company has low pressure steam which might otherwise go to waste it must provide a special water heater or special water system in order to use the low pressure steam for the heating of the water. There is also the disadvantage of being unable to control the temperature of the water after it enters the circulating system. There are instances when a hot water spray is used, such as in the case of spray pasteurizers, in which case both the spray pipes and the heating surfaces have to be cleaned periodically in order to keep the equipment in good condition.

When steam is used under ordinary conditions to heat the milk it necessarily has a temperature of at least 212° F. and there is necessarily a great amount of "burning on" of the milk within the pipes or coils through which it is circulated due to the great temperature differences between the steam and the milk.

With my invention and apparatus as disclosed herein most or all of these disadvantages are overcome. In general the invention consists of a chamber which is partially filled with liquid such as water. If the milk is to be heated to any temperature below 212° F. a vacuum is created within the chamber thereby reducing the pressure on the surface of the liquid to a minimum and lowering the boiling point thereof. Conduits pass through the chamber above the surface of the liquid which carry the milk or fluid to be heated. Any desired means may be used for heating the water or liquid within the chamber and for purposes of illustration I have preferred to show a series of steam coils which carry steam at approximately 212° F. or more. If the liquid used is water and it is desired to heat the milk to say 140° F. then all of the air possible is removed from the chamber to lower the boiling point of the liquid. The water is then heated to the desired temperature whereupon the vapor rising therefrom will contact the conduits carrying the milk, transfer the heat thereto, condense and return to the main body of the liquid. In this way substantially no scale will be formed on the outside of the conduits, or at least it will be deposited thereon only once, since the same water is used continuously, after which time there will be no impurities left in the water to form a scale thereon. If the temperature difference between the milk entering the chamber and the liquid vapor therein is sufficiently great there will necessarily be a small amount of "burning on" of the milk within the conduits but at least there will not be as much as when the milk is heated by steam or hot water at still higher temperatures since it is apparent that the temperatures of the vapor in such case as above mentioned will be only 140° F. It should also be noted that with my apparatus waste steam at lower pressure can be used to heat the water which in turn heats the milk.

The temperature within the chamber is governed by the rate of vaporization and condensation of the liquid therein. If vaporization takes place more rapidly than condensation, then the pressure in the chamber will be increased thus raising the boiling point of the liquid and the temperature of the vapor. This rate of vaporization is controlled by the amount and temperature of the steam in the steam coils.

It is therefore one of the objects of this invention to provide a means of heating milk or other substances with steam or other liquid vapor to any desired temperature above or below the temperature of such vapor at atmospheric pressure.

Another object of the invention is to provide a heating apparatus for milk or other fluids which will obviate the necessity of periodic taking apart and cleaning of the equipment.

A still further object of the invention is to provide an apparatus which will eliminate the formation of water scale on the heating surface.

Still another object is to provide an apparatus which is capable of being controlled in such a way as to heat the fluid to any desired temperature and maintain it at that temperature for a period of time.

Other objects and purposes of the invention will appear more fully as the description proceeds.

To the accomplishment of the foregoing and related ends said invention, then, consists of the means hereinafter fully described and particularly pointed out in the claims. The annexed drawing and following description set forth in detail certain means for carrying out my invention, said means constituting, however, but one of various ways in which the principle of the invention may be employed.

In said annexed drawing, wherein like reference numerals refer to like parts throughout the various views:

Fig. 1 is a vertical longitudinal section through the chamber of my invention.

Fig. 2 is a somewhat enlarged fragmentary horizontal section through one end of the chamber disclosing a novel means for connecting together the conduits in pairs.

Fig. 3 is a vertical transverse section through the chamber looking toward one end thereof.

Fig. 4 is a diagrammatic view and end elevation of a plurality of chambers interconnected disclosing one method of progressively heating a fluid.

Referring more particularly to the drawing and more especially to Fig. 1, the chamber which is used in carrying out the invention is indicated at 1. In the bottom of the chamber there is provided a quantity of liquid, such as water, substantially up to the level of the dotted line indicated at 2, an overflow pipe 3 is provided which extends through the lower side of the chamber, and at its upper side the chamber has an inlet tube 4.

Within the chamber in the space above the liquid I provide a plurality of conduits 5 which have a milk inlet at 6 and an outlet 7. In the particular construction which I have shown the conduits themselves extend merely between the ends of the chamber and connections between the pairs of conduits whereby the milk is continually circulated are provided on the inner surface of the doors 8 located one at each end of the chamber. The only conduits which extend entirely through the doors are the inlet and outlet ends 6 and 7. Referring now more particularly to Fig. 2 it will be seen that each door 8 is provided with a plurality of recesses 9 of such size and in such a position as to connect tightly with selected pairs of conduits thereby providing a continuous circuit through which the milk may pass. An obvious advantage of this arrangement is that the conduits may be easily cleaned upon merely opening the doors which will immediately give access to the interiors of such conduits from one end thereof to the other. As will be noted in Fig. 2 hinges 10 are provided on which is pivotally mounted the door 8 and at the opposite side of the chamber a latching mechanism generally indicated at 11 is provided to securely lock the door in closed position. A gasket will be provided between the end of the chamber and the door to insure a tight seal preventing leakage of milk.

Any means may be used for reducing the pressure within the chamber such as a vacuum pump shown at 12 which may be connected by means of the conduit 13 with an opening 14 at the top of the chamber. In the conduit 13 a control valve 15 is located and in the end of the conduit is located a relief valve 16. Also at any desired location in the chamber a combination pressure and vacuum gauge 17 is located to indicate the pressure which is present within the chamber.

While it has been mentioned that any desired means of heating may be used, in the preferred embodiment of the invention I have disclosed a series of steam coils 18 which are located longitudinally of the chamber and within the confines of the water or other liquid located therein. The usual boiler 19 is provided which is used in a system of this nature to provide steam which passes through the conduit 20 and to the steam coils 18. The opposite ends of the coils are connected with an outlet pipe 21 where the steam may return to the boiler in a condensed form. Under ordinary circumstances the temperature of this steam passing through the coils 18 will be substantially above 212° F. but regardless of the temperature of such steam the vapor within the chamber which heats the milk cannot rise above the temperature of vaporization of the liquid therein previously determined by the pressure which is to be maintained within the chamber.

In cases where it is desired to increase the temperature within the chamber it may be done by increasing the vaporization of the liquid therein. Obviously when this is done the pressure within the chamber will increase, increasing the boiling point of the liquid and therefore the temperature of the vapor. The rate of vaporization is controlled by the temperature and amount of steam entering the steam coils 18 and for purposes of regulating the amount of steam in the coils I provide a valve 22 located in the inlet line 20. This valve is automatically controlled as will be more clearly set forth hereinafter.

If sufficient steam at a sufficiently high temperature is passing through the coils 18 it may be possible that the rate of vaporization will be so much faster than the rate of condensation thereof that a pressure will be built up within the chamber exceeding atmospheric pressure. If and when this situation occurs the safety valve 16 mentioned above will be released to prevent damage to the chamber itself.

In Fig. 3 there is disclosed the control valve 22 having a connection 24 with a thermostat bulb 23 located in a welded-in well within the chamber and beneath the surface of the liquid therein. The thermostat can be set to the desired temperature within the chamber and will automatically control the valve 22 so that the right amount of steam will pass through the coils 18 to maintain that temperature. It may be well to point out here that this thermostat could also be in contact with the milk itself and still operate on the same principle and in the same manner.

In certain instances it may be desirable to heat the milk or other fluid to a comparatively high temperature without subjecting the fluid suddenly to such high temperature. In other words, it is within the contemplation of my invention to construct an apparatus whereby the milk may be heated progressively and gradually from a low to a high temperature. It will be obvious when this is done that if the temperature difference between the heating medium and the milk at the time it enters the chamber is not too great there will be little or no "burning on" of the milk in the conduits. An apparatus of this nature is disclosed in Fig. 4 wherein I have shown a plurality of chambers 1 connected in series. These chambers are similar to the ones shown in Fig. 1 and contain the usual milk conduits 5. However, the outlet of one chamber is connected to the inlet of the adjacent chamber. This may be carried on to as great a number of chambers as desired, but for purposes of illustration I have preferred to show three chambers so connected. The connecting means between the outlet and inlet conduits of adjacent chambers are indicated at 25.

In this system and method of progressively heating the fluid the usual vacuum pump is provided which is connected to the various chambers by means of the pipe 13 and valves 15. In this method a lower vapor pressure will be maintained in the initial chamber to which the milk is admitted, and a progressively greater pressure is created and maintained in each successive chamber. The usual liquid and steam coils are located in the bottom of each chamber and the liquid is brought to the desired boiling point in each case. In the first chamber however the boiling point will be lower than that in subsequent chambers due to less pressure on the surface of the liquid. It will be obvious then that in a system of this nature the fluid to be heated may reach a relatively high temperature in the last chamber, but it may be heated to such temperature progressively by a slower process so that if the fluid is milk, there will be little or no "burning on" thereof.

Either of these forms of the device may be utilized for example, for pasteurizing milk. If the ordinary pasteurizing procedure is to be carried out the milk will be brought to the approximate temperature of 143° F. and maintained at that temperature for a period of substantially 30 minutes. On the other hand if the process known as flash pasteurization is to be carried out the temperature of the milk may be brought from 166 to 170° F. and immediately cooled. If the device shown in Fig. 1 is used for either of these processes there may be a certain amount of "burning on" of the milk in the conduits, while if the device of Fig. 4 is used there will be a lesser amount of "burning on" due to the slower process of heating the milk. In either case however there will be little or no water scale formed on the heating surfaces for reasons mentioned hereinbefore.

I do not intend to be limited to the milk being carried through the chambers in conduits, since this method can easily be carried out by merely providing a tank with a jacket therearound from which the air has been exhausted and in which the water and steam coils are located. The milk in the tank will then be agitated and the process carried on in the manner described above.

From the foregoing description it will be obvious that I have constructed a novel means for heating fluids and specifically for heating milk, which means has decided advantages over milk processing equipment now in use. By reason of the fact that I am able to substantially lessen the "burning on" of milk the flavor thereof will be decidedly improved. Because of the further fact that little or no water scale will be formed on the heating surfaces it will seldom, if ever, be necessary to take the equipment apart for external cleaning.

The ease with which the insides of the milk conduits can be cleaned should be noted due to the improved construction of the return bends therein, which, instead of being integral with each conduit, are provided in the doors of each end of the chamber so that when the doors are opened both ends of every tube will be open so that they can be easily swabbed out.

It will also be evident from the foregoing description that the same rate of heat transfer will take place over the entire heating surface in contact with the milk which is being heated. This is an advantage which has not been able to be obtained heretofore. Also it is a decided advantage that low pressure steam can be used for heating purposes obviating the necessity of using a separate heater and water circulating system.

Other modes of applying the principle of my invention may be used instead of the one here explained, change being made as regards the structure herein disclosed, provided, however, that the means stated by any of the following claims or the equivalent of such stated means be employed.

I, therefore, particularly point out and distinctly claim as my invention:

1. An apparatus for heating fluids comprising, a sealed chamber, a body of liquid in the lower part of said chamber, means for conducting liquid to be heated through the chamber located above said first mentioned liquid, means for circulating a heat supplying medium through said liquid to raise its temperature to its vaporization point under the conditions of pressure within said chamber, means for effecting an initial preselected condition of pressure within said chamber to thereby preselect the temperature to which the liquid in the chamber boils and vaporizes, and means for automatically controlling the passage of said heat carrying medium through said liquid to reduce said passage upon said liquid attaining a temperature above said initially preselected temperature, and providing a greater flow of said medium upon reduction of temperature below said preselected temperature.

2. An apparatus for heating fluids comprising, an elongated sealed chamber in the lower part of which water is located, conducting means passing through the chamber above the water through which the fluid to be heated is circulated, means for withdrawing air from the chamber to reduce pressure within the chamber and reduce the boiling point of the water to a predetermined stage, means to heat the water to the boiling point whereby steam provided thereby will heat the fluid and will condense and return to the body water, and means for automatically controlling the means heating the water to reduce heat acting on the water, upon increase of water temperature under pressure of vapors therefrom.

3. An apparatus for heating fluids comprising, a sealed chamber partly filled with water, conduits passing through the chamber above the water through which the fluid to be heated is circulated, means for withdrawing air from the chamber to reduce pressure therein below atmospheric pressure and thereby lower the boiling point of the water, means to heat the water to the boiling point whereby steam will rise and condense on the conduits to heat the fluid therein and the condensed steam return to the body of the water, said heating means comprising conduits passing through the body of the water and carrying a heated fluid, said conduits having a supply inlet conduit, a valve in said last mentioned conduit for regulating the passage of fluid, and a thermostat extending into said chamber in the body of water having means connecting it with said valve to automatically operate the valve to reduce the passage of said heating fluid on pressure within the chamber and consequent boiling temperature of the water increasing substantially above the initially selected chamber pressure and water temperature at which the water boils.

4. An apparatus for heating fluids comprising, a sealed chamber in the lower part of which water is located, means for withdrawing air from the chamber to reduce the pressure within the chamber and thereby reduce the boiling point of the water to a predetermined stage, means to heat the water to the boiling point and to produce steam, means for automatically controlling the water heating means with relation to the temperature of the water and to maintain a constant temperature thereof and a container to contain the fluid to be heated, said container being within said chamber and in contact with the steam therein.

5. An apparatus for heating fluids comprising, a sealed chamber in the lower part of which liquid is located, means for withdrawing air from the chamber to reduce the pressure within the chamber and thereby reduce the boiling point of the liquid to a predetermined stage, means to heat the liquid to the boiling point and to produce vapor, means for automatically controlling the liquid heating means with relation to the temperature of the liquid and to maintain a constant temperature thereof and a container to contain the fluid to be heated, said container being in contact with the vapor in said chamber.

JOSEPH W. CHAMBERLAIN.